United States Patent [19]

Martins

[11] Patent Number: 5,291,595
[45] Date of Patent: Mar. 1, 1994

[54] BATCH/APPLICATION PROGRAM PROCESSING

[76] Inventor: Augusto B. Martins, 777-58 San Antonio Rd., Palo Alto, Calif. 94303

[21] Appl. No.: 911,261

[22] Filed: Jul. 7, 1992

Related U.S. Application Data

[63] Continuation of Ser. No. 354,895, May 22, 1989, abandoned.

[51] Int. Cl.$^5$ .......................... G06F 7/10; G06F 7/32; G06F 12/00
[52] U.S. Cl. ............................. 395/600; 364/245.2; 364/246.11; 364/254.6; 364/286.2
[58] Field of Search .......................... 395/650, 700, 600

[56] References Cited

U.S. PATENT DOCUMENTS

| | | | |
|---|---|---|---|
| 4,297,743 | 10/1981 | Appell et al. | 395/650 |
| 4,642,763 | 2/1987 | Cummins | 364/300 |
| 4,873,623 | 10/1989 | Lane et al. | 364/200 |
| 4,969,092 | 11/1990 | Shorter | 364/200 |
| 5,010,478 | 4/1991 | Deran | 364/200 |
| 5,010,481 | 4/1991 | Ishida | 395/425 |
| 5,062,060 | 10/1991 | Kolnick | 364/521 |
| 5,175,828 | 12/1992 | Hall et al. | 395/375 |

OTHER PUBLICATIONS

Somerson, P.: 1988 P. C. Magazine DOS Power Tools p. 107 Bantam Books, Inc. New York, N.Y.

Primary Examiner—Gareth D. Shaw
Assistant Examiner—John Q. Chavis

[57] ABSTRACT

A process for executing batch files and application programs by storing the batch files and information about the application programs together as modules inside a parent file, such that each module may be extracted from the parent and executed independently of any other module according to its type. Access to the module is through a menu which provides for each module the name of the module and optionally a phrase descriptive of the module. Batch modules may be relocated to RAM disks for faster execution. When running a batch module, the process of this invention cedes all its memory to the batch module. Program information modules are checked to determine if they provide a program specification or a path specification: if program specification, the program is executed; if path specification, executable files from the specified directory are retrieved and displayed for execution as desired.

16 Claims, 2 Drawing Sheets

```
╔═B.BAT═══════════════════════╗
║    Introductory Module      ║
║  ┌───────────────────────┐  ║
║  │ ECHO OFF              │  ║
║  │ IF %1!==! GOTO ERR    │  ║
║  │ GOTO %1!              │  ║
║  └───────────────────────┘  ║
║           Body              ║
║  ┌───────────────────────┐  ║
║  │ :BA!                  │  ║
║  │ :PIF                  │  ║
║  │ GOTO ERRM             │  ║
║  │ ......                │  ║
║  │ :BA!                  │  ║
║  │                       │  ║
║  │ ::::::::::::::::::    │  ║
║  │ :: More Modules ::    │  ║
║  │ ::::::::::::::::::    │  ║
║  │                       │  ║
║  │ :BZ!                  │  ║
║  │ ......                │  ║
║  │ GOTO END              │  ║
║  │ :BZ!                  │  ║
║  └───────────────────────┘  ║
║         End Module          ║
║  ┌───────────────────────┐  ║
║  │ :ERR                  │  ║
║  │ ECHO  Missing Parms   │  ║
║  │ GOTO END              │  ║
║  │                       │  ║
║  │ :ERRM                 │  ║
║  │ ECHO  %1 is PIF       │  ║
║  │                       │  ║
║  │ :END                  │  ║
║  └───────────────────────┘  ║
╚═════════════════════════════╝
            Fig 2
```

```
╔═BATCH═══════╗   ╔═PIF═════════╗
║ ECHO OFF    ║   ║ C:\DOS      ║
║ C:          ║   ║ BASICA.COM  ║
║ CD \DOS     ║   ╚═════════════╝
║ BASICA      ║
╚═════════════╝
     Fig 1
```

```
╔═CBF══════════════════════╗
║ ECHO OFF                 ║
║ D:\DRIVER                ║
║ IF ERRORLEVEL 1 GOTO END ║
║ D:\$$                    ║
║ :END                     ║
╚══════════════════════════╝
          Fig 4
```

```
╔═Memory══════╗
║ FREE SPACE  ║
╠═════════════╣      ╔═Before═══════╗
║    HELP     ║      ║ :BZ          ║
╠═════════════╣      ║ ECHO OFF     ║
║  FILE LIST  ║      ║ ......       ║
╠═════════════╣      ║ GOTO END     ║
║    MENU     ║      ║ :BZ!         ║
╠═════════════╣      ╚══════════════╝
║ PARAMETERS  ║
╠═════════════╣      ╔═After════════╗
║    STACK    ║      ║ ECHO OFF     ║
╠═════════════╣      ║ ......       ║
║    CODE     ║      ║ GOTO END     ║
╠═════════════╣      ║ :END         ║
║             ║      ║ D:\CBF       ║
║    DOS      ║      ╚══════════════╝
╚═════════════╝
    Fig 6                Fig 7
```

```
╔═Menu Items══════════════╗╔═Modules═══════════════════╗
║                         ║║ Start of file B.BAT       ║
║ BA  BASICA INTERACTIVE  ║║ :BA! START OF BA MODULE   ║
║                         ║║ .....                     ║
║ BI  BIOMETRICAL METHODS ║║ :BI! START OF BI MODULE   ║
║                         ║║ ......                    ║
║ BM  BUSINESS MANAGER    ║║ :BM! START OF BM MODULE   ║
║                         ║║ ......                    ║
║ BP  BASIC PROGRAMS      ║║ :BP! START OF BP MODULE   ║
║                         ║║ ...                       ║
║                         ║║ End of B.BAT              ║
╚═════════════════════════╝╚═══════════════════════════╝
                    Fig 3
```

BATCH/APPLICATION PROGRAM PROCESSING

This application is a continuation of Ser. No. 354895, filed May 22, 1989 now abandoned.

BACKGROUND

1. Technical Field

This invention relates to a process of economically storing batch and program information files for fast access and execution.

2. Description of Prior Art

An user communicates with a computer in one of two modes:
1. Interactive mode: The user keys in the command or a program name and the computer executes it after it is keyed in.
2. Batch mode: The user enters a series of command or program names in a file and later executes all the commands and programs in that file by keying in just the name of the file. Said files are called batch, script, execs, etc depending on the computer and/or the operating system and have an associated command language of their own.

On personal computers with MS-DOS disk operating system, commonly referred to as DOS, said files are called batch files and are identified by the file extension BAT. MS-DOS is a registered trade mark of Microsoft Corporation.

On the mini and mainframe computers, the term batch file is generally used for files submitted to a dedicated processor, for later execution at some scheduled time, without user intervention. However, the distinction lies in the mode of executing the batch files, not in the files themselves nor in the mode of communication.

Thus, on the IBM main frames running under VM/CMS operating system the executable files, passed to the batch machine or executed directly by the user by keying in the file name, have the file type of exec and use the same command language. The terms file type and file extension are equivalent terms. Therefore, the term batch file will be used to identify executable files used in the batch mode, without implying any particular mode of execution.

Program information files, called PIF hereafter, contain information about single applications, such as application name, location, etc. This information is used by another program, the calling program, to execute the application. PIFs are sort of single application non-executable batch files.

FIG. 1 illustrates the relationship between a single application batch file and a PIF on DOS. The first command in the said batch file turns off the display of batch commands. The second command changes the disk, the third command changes the path to the directory where the program BASICA.COM resides, and the third command executes the said program. The corresponding PIF provides the location and name of the application to a calling program, which does the actual execution.

PIFs can and have been used to provide additional information beyond that indicated above, such as application's memory requirements, etc and have found most use in creating menu driven multi tasking environments such as IBM's TopView. IBM is a registered trade mark of International Business Machines Corp.

It can be intuitively appreciated that both batch files and PIFs are tremendously powerful tools. But there are disadvantages to both.

Disadvantages of batch files:
1. They waste computer storage space. The batch files tend to be small, usually 100 characters long. Depending on the storage scheme, implemented by the particular computer, they may use a lot more space. Thus, on the IBM PC/XT, the minimum file allocation unit is 4096 characters for a hard disk and 1024 characters for a diskette.

The problem has been acknowledged for the personal computers (Somerson 1988 P. C. Magazine DOS Power Tools, pg. 107).

Hewlett-Packard's HP 3000, a minicomputer, allows one or more UDCs-user defined commands- to reside in one file. The UDCs can process only system commands. They cannot handle application programs. (MPE V Commands Reference Manual 1986. pg. 3–9). Hewlett-Packard is a registered trade mark of Hewlett Packard Company.

2. They need menu drivers. Because batch files perform multiple tasks, it is not often possible to assign them names that reflect the tasks performed. Besides, users prefer short names, two or three digits, to reduce the number of key strokes that need to be typed or that may be mistyped. This makes some kind of a calling program or menu driver mandatory in a system with a large number of batch files.

System wide menu drivers have not found much favor with the general user.

First, they consume memory at the expense of the application. Second, the various implementations of menu driven systems have created problems of their own. Third there is the sheer tedium of setting up menus, after the user has installed his application.

One kind of menu driver, uses PIF files, one for each program serviced. PIFs are also small files and when used to service a batch file double the amount of storage space that is wasted. PF keys, Program Function keys, have been used to set up menus. Such menus are limited to the number of PF keys supported by the operating system, which may be as low as 12. Another disadvantage is that the application programs serviced by the menu may be pre-empted from using the PF keys.

Another approach is to display a list of files within any given directory, point to any desired file and execute it. This approach is fine with programs that have achieved name recognition but otherwise degenerates into a crap shoot.

HP 3000 indexes or catalogs the UDCs in a directory at each logon. The directory lists only the name of the UDC, which could be a single letter, and provides pointers for the operating system to locate the file where the said UDCs reside. A Help system can be called separately to display the entire text of an UDC.

3. They are slow in execution. The batch files are executed a line at a time. Disk access is one of the slowest tasks performed by a computer.

On the IBM PC and similar computers, it is possible to create a RAM or virtual disk in computer memory and execute the batch file from there. But this is a three step operation. First you copy the batch file to the RAM disk and then you execute it, and finally you delete it.

It is possible, however, to load often executed batch files into RAM at logon, and execute them as needed, without having to delete after each use. RAMs can be set up in expanded, non-executable memory and thus do not shrink the computer's executable memory.

Similarly, on IBM main frames, it is possible to load often used execs directly into main memory, at log on.

Another approach for machines running under DOS, is to use a batch processor to copy the batch file into memory, process application programs and commonly used commands within the processor and process the other commands with a secondary copy of DOS command processor. (U.S. Pat. No. 4,642,763 1987 Cummins 364/300). This approach has obvious demerits when processing batch files with several "uncommon" commands.

Program Information Files:

As already mentioned above, PIFs waste storage space and, as currently implemented, process only a single application.

In TopView, individual PIFs are copied and consolidated into a single large master file. An index to the said master file is generated separately which provides the menu interface.

OBJECTS AND ADVANTAGES

The above review of prior art discloses that the power and versatility of the batch files have been appreciated by the users at all levels, and just as well by the computer manufactures. But there are also recognized disadvantages to the use of batch files which have not been overcome.

Accordingly, the objects and advantages of this invention are:

1. Eliminate the wastage of storage space inherent in the use of batch files.
2. Provide a menu interface for batch files without the wasteful use of PIFs.
3. Improve batch program performance by automatically executing said program from RAM disks, if the user so desires and the computer is appropriately configured.

An additional object and advantage of this invention is to eliminate the wastage of storage space in the use of PIfs.

Another object and advantage of this invention is to provide a means of accessing multiple applications through a single PIF.

Yet another object of this invention is to provide a menu driver with flexible memory management so that it can execute an application, without squandering any memory on itself.

A further object and advantage of this invention is the improvement in disk access time for systems with large number of batch files and applications.

DESCRIPTION OF DRAWINGS

FIG. 1 illustrates the relationship between a single application batch file and a program information file (PIF), according to prior art.

FIG. 2 is a schematic drawing showing the structure of an executable parent file and its constituent modules according to the invention.

FIG. 3 is a schematic drawing showing the relationship between the modules and the menu items, according to the invention.

FIG. 4 is the text of a controlling batch file (CBF) according to the invention.

FIG. 6 shows the memory locations of the buffers used by the said computer program. It is not drawn to scale.

FIG. 7 is a schematic drawing of a hypothetical batch module as extracted from the parent file, before any changes are made to the said module, compared with the same module after it is written to disk or memory as an executable batch file, according to the invention.

DETAILED DESCRIPTION OF THE INVENTION

Figure 5:
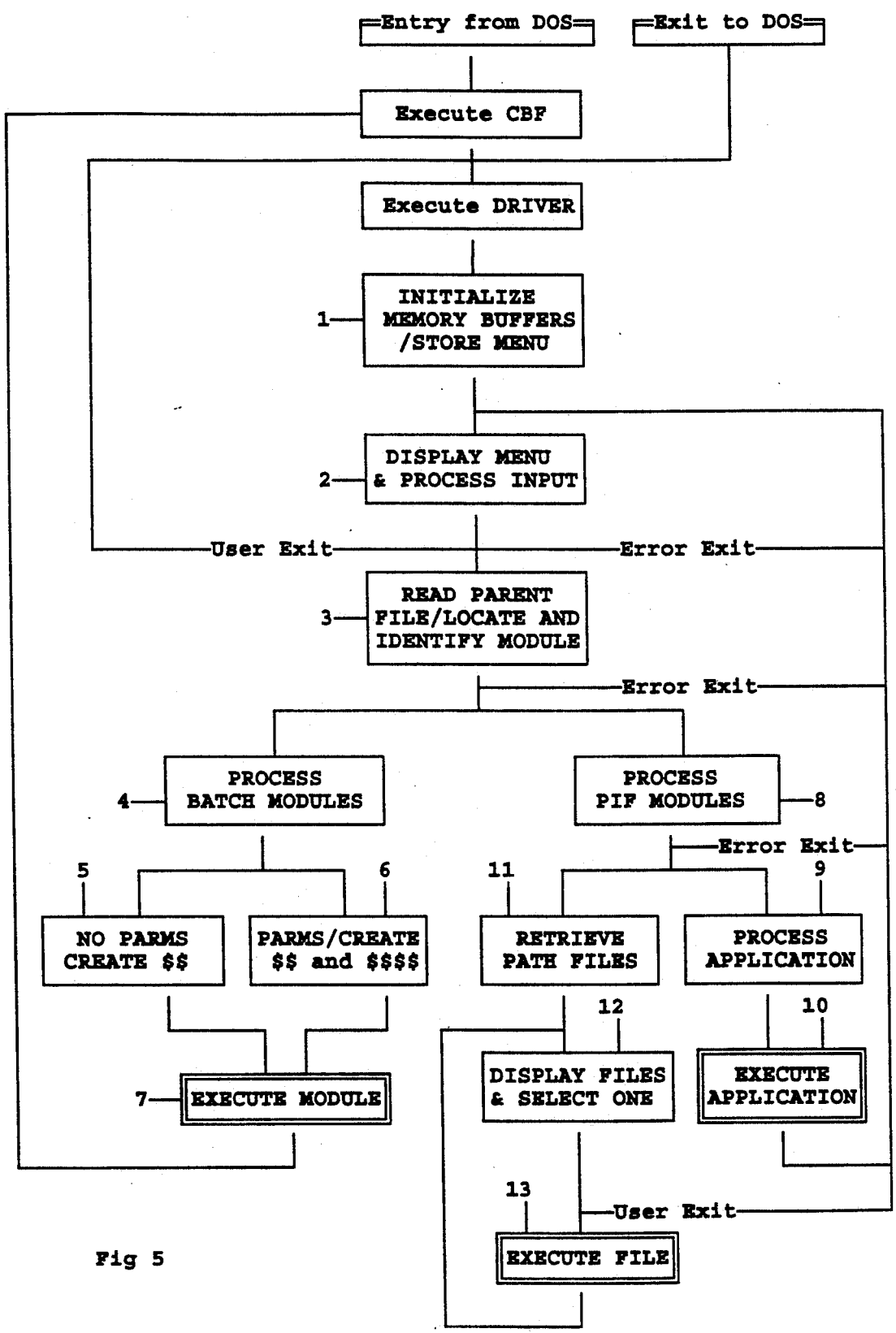
FIG. 5 is the flow chart of the computer program, according to the invention.

The invention comprises the following components:

1. The Program module which is located in a larger parent file. The program module may be a batch program or information about an application program such as ordinarily maintained in PIFs, or a path module containing just a path specification to a directory. The latter two modules will be collectively referred to as PIF modules.
2. A menu file in which each menu item corresponds to a program module.
3. A computer program which displays the menu, obtains user input, and executes the desired module.

The Program Module.

The batch files are set up as relocatable, independently executable modules within a larger parent file. The PIF files are set up as relocatable modules. The batch modules and the PIF modules may be mixed in any order.

Each module has a two part name. One part, usually the first, is the same as the name of the parent file. The other part, usually the second, is unique to the module within its parent.

Thus a parent file named A could have modules AA through AZ and another parent file named B could have modules BA through BZ.

The start and end of each module within its parent file is demarcated by a delimiter.

The start delimiter consists of the module name. Said name may, optionally, be prefixed and/or suffixed with one or more characters. Thus:

:AA! where AA is the name of the module.

The end delimiter may be generic i.e. the same for each and and every module within the system or the same as the start delimiter. Other options are possible. The purpose of the delimiters is to unambiguously define the start and end of any module.

PIF modules are identified by placing a control word :PIF, on the line following the start delimiter. As mentioned above, there are two types of PIF modules: path modules and application modules. Path modules contain only a path specification to a directory which contains the actual applications. As will be described below, path modules are a convenient means to access several applications through a single PIF and saves the user the tedium of writing a batch module or a PIF module for each and every application.

The batch and PIF (application) modules may optionally use another control word to signal said computer program to pass parameters to the said batch module or the application program serviced by the said PIF module.

Thus in the preferred and actually implemented embodiment of this invention, the control word :ASK optionally followed by a string, is used to signal the said computer program to prompt the user for parameters to be passed to the batch module or the application program.

The parent file need not be set up as an executable batch file. However, it may be desirable to do so for testing purposes, etc.

To set up a parent file as an executable file, there are additional requirements that must be met.

Each batch module ends with a GOTO END statement, or a functionally similar statement, where END is the name of a label, the landing pad for said GOTO instruction and the final exit from the parent file. The statement may be placed before or after the ending delimiter.

Each PIF module has a GOTO ERRM statement on the line following the control word: PIF.

The start delimiters must be acceptable to the operating system as labels. A convenient way to ensure acceptance is to prefix the module name with the label identifier, i.e. the character that tells the operating system that the string following the character is the landing pad of a GOTO instruction and not an executable statement.

Additionally each parent file must have an introductory module and an end module.

Quite obviously the particular embodiment of these specifications will vary with the operating system and the implementer's preferences and prejudices.

For example, user's skilled in DOS might elect to dispense with the end module and replace the appropriate GOTOs with fast exit bats (Somerson ibid pg. 562).

Certain operating systems, such as UNIX do not support GOTOs. In such cases a different approach has to be used to set up an executable parent file. Thus in UNIX, the case operator can be used to process batch module names and all PIF modules can be placed outside the case construct. UNIX is a registered trade mark of AT&T Bell Laboratories.

The preferred and actually implemented embodiment of this invention uses a single digit file name and a two digit module name. Letters A–Z are valid for the file name and the first digit of the module name. The second digit of the module name may additionally include numbers 0-9.

This scheme provides access to over 500 applications using only 26 files thereby greatly decreasing the disk access time in installations with a large number of applications.

FIG. 2 illustrates the structure of an executable parent file, according to this invention, for an IBM PC running under DOS.

The File Name: It is B. Since the file has been designed to be executable it has an extension BAT, otherwise it would have a non-executable extension or no extension at all. DOS allows files with no extensions.

The Introductory Module: It checks if any parameter has been passed to the parent file from the DOS command line.

Typically, a module within an executable parent file can be executed, from the DOS command line, by entering the name of the said parent followed by the name of the desired module. Thus:

B BZ will execute the module BZ in the file B. Execution will be slow, because DOS has to wade through the entire text of the file B, starting at the beginning, line by line, until it finds the module BZ. This alternative is provided for those users who may occasionally have the need to execute a batch module from the DOS command line. The standard way is through the menu interface and will be explained hereafter.

The Body: It consists of independent batch or PIF modules. To make the modules relocatable, each module begins with and ends with a delimiter. In this example, the start and end delimiter are the same.

The start delimiter always contains the module name. In this illustration the module name is prefixed with ":" which is a label identifier in DOS. This ensures that DOS does not react to the delimiter with an error message. The delimiter ends with!. This increases the assurance that the delimiter will be unique for each module.

The End Module. It has three labels:

:ERR The landing pad for a GOTO, in case a parameter was not passed, followed by an appropriate message.

:ERRM The landing pad for a GOTO, in case a PIF module was access ed, followed by an appropriate message.

:END The landing pad for the final exit from the parent file.

The Menu File

Each module in the system is represented by a record in the menu file. Each record consists of two parts:
1. A command code which is the same as the corresponding module's name.
2. A phrase which describes the command.

FIG. 3 illustrates the relationship between the modules and the menu items.

The Computer Program

There are many ways to implement a computer program of this invention. Some of these are dictated by the requirements of the operating system. Described below is the preferred embodiment of this invention as implemented for personal computers running under DOS.

The computer program consists of two parts:
1. A batch file, hereafter called CBF-controlling batch file.
2. An executable program in machine language, hereafter called the driver.

To perform its tasks, the driver needs certain information, e.g.:
1. The location of the parent files.
2. The location of the menu file and any other files such as error message file or help message file, that the driver might need.
3. The location from which the CBF file will be executed.
4. The location from which the driver will be executed.

Default values may be hard coded into the driver. Additionally a separate setup program may be provided to change the default values following installation.

DOS provides two additional means for making the changes.
1. By setting up the appropriate environmental variables in the Autoexec.bat file.
2. By setting the appropriate environmental variables through DOS set command.

In the preferred and actually implemented embodiment of this invention, the default values are hard coded and a separate setup program is provided that can change some of these values. The setup programs prompts the user for new values. These new values then replace the hard coded values in the object code of the driver and the CBF.

Specifically, the parent files are always located in a directory named BATCH in the root directory. Said CBF always resides and is executed from a root directory. The driver and the files it uses reside together in a subdirectory in the root directory. The user has the option of relocating the driver elsewhere for execution as shall be described below. During execution, the driver creates certain files. These files are always created in the directory from which said CBF is executed.

CBF-the controlling batch file: FIG. 4. shows the text of a CBF. On first call to CBF, it executes the driver. Said driver returns to CBF with error level set to 0 or 1.

If error level is 1, CBF exits to DOS.

If the error level is 0, the batch file $$ is executed. As shall be described below, the batch file $$ is created by said driver. Except as otherwise noted, the last line executed by said $$ is as follows:

D:\CBF where

D is the drive letter,

CBF is the actual name of the controlling batch file.

Said line provides a means for executing batch modules, and returning control back to CBF and eventually to said driver.

The Driver: FIG. 5 is a flow chart of the driver's various processes and interactions with CBF. The driver performs the following tasks.

1. INITIALIZE MEMORY BUFFERS/STORE MENU.

1.1.

Creates five buffers at the end of code as shown in FIG. 6.

The first buffer next to the code is for the driver's stack. It is 256 bytes long. The word at the top of the stack is zeroed and the stack pointer is set to point to said word.

The second buffer is for the parameters. It is 80 h bytes.

The third buffer is for the menu file. It is hard coded to hold a maximum of 512 menu records.

The fourth buffer is initially used to store the parent file, according to user's input. If the module selected by the user is a path module, the fourth buffer is reused to store a list of files from the specified directory as shall be described below.

The sixth buffer is used to store messages from a help file.

1.2 The menu file is opened and read into third memory buffer and menu pointers are set to the start and end of said menu in the buffer.

2. DISPLAY MENU & PROCESS INPUT.

2.1 Displays a page of menu on the screen and prompts the user for input.

2.2

Processes the input.

If the user enters a valid command code, processing continues at task 3.1

If the user wants to quit, the driver exits with an error level of 1.

If the user wants to update the menu items, the appropriate routine is called. On completion of the update the driver loops back to task 2.1

If the user wants to scroll the display, the appropriate routine is called and the driver loops back to task 2.1

If none of the above is true, the driver issues an appropriate error message and loops back to task 2.1

In the preferred and actually implemented embodiment of this invention, Fkeys are assigned to the three update functions: add, change and delete. PgUg and PgDn keys perform scrolling by page and the up and down arrow keys scroll a line at a time. Since these aspects of the driver are known to prior art, they will not be described further here.

3. READ PARENT FILE/LOCATE AND IDENTIFY MODULE.

3.1 Saves the command code.

3.2 Opens the parent file which has the same name as the first digit of the command code, and the extension BAT.

3.3 Reads the contents of the parent file into the fourth memory buffer as described in task 1.1

3.4 Searches the buffer for the module whose name is the same as the command code previously input by the user, and saved in task 3.1.

3.5 If either the start delimiter or the end delimiter is not found, issues an error message and loops back to task 2.1.

3.6 Saves the start and end of the module.

3.7 Checks the first line of the module, after the starting delimiter, for the control word :PIF. If found processing resumes at task 8.1.

4. PROCESS BATCH MODULES 4.1. Inserts in the buffer at the end of the module the following two lines:

:END

D:\CBF and terminates the module with a carriage return, a line feed and an end of file mark.

4.2 Rechecks the first line of the module for the control word :ASK. If found, processing resumes at task 6.1.

5. NO PARMS/CREATE $$.

5.1

Creates a batch file named $$, copies the contents of the module, including the two appended lines, from the buffer to the newly created file.

FIG. 6 illustrates the contents of module BZ in memory buffer before task 4.1 above and the contents of file $$ after the end of task 5.1.

5.2 Exits with error level set to 0. Processing resumes at task 7.1

6. PARMS/CREATE $$ AND $$$$.

6.1 Creates a batch file as described in task 5.1 above, but names it $$$$.

6.2 Displays the string, following the control word and on the same line as the control word. This display serves to remind the user, the number and/or the kind of parameters that the user needs to pass to the application.

6.3. Asks the user to input the parameters.

6.4 Creates a batch file named $$ and writes to this file only the following two lines:

ECHO OFF $$$$ COMMAND CODE PARAMETERS where:

$$$$ is the name of the file created in task 6.1 above.

COMMAND CODE is the user input that was saved at task 3.1 above.

PARAMETERS is the input received from the user at task 6.3 above.

6.5 Exits with error level set to 0.

7. EXECUTE MODULE.

7.1 On the driver's exit from tasks 5.2 and 6.5, CBF receives control and executes batch file $$.

7.2 If CBF receives control after task 5.2, said $$ executes the module that has been copied into it and then executes CBF. CBF loads the driver and processing resumes at task 1.

7.3 If CBF receives control after task 6.5, said $$ executes the batch file $$$$, and passes to said $$$$, the afore said command code and parameters. Said $$$$ executes the batch module which has been copied into it and returns control to CBF and eventually to said driver. Processing resumes at task 1.

8. PROCESS PIF MODULES.

8.1

Searches for a drive identifier. The drive identifier is a letter from A-Z suffixed with a colon, e.g. C:. Search begins on the line following the control word. :PIF If found at the start of a line, the entire line is treated as a path specification and executed, otherwise the driver issues an error message and loops back to task 2.1.

8.2 Checks for end of module. If end is reached, said module is a path module and processing resumes at task 11.1.

9. PROCESS APPLICATION.

9.1 The line following the path specification is treated as an application name. Saves start of said name, locates end and terminates it with a zero.

9.2 Checks if the end of module has been reached. If end is reached, said application does not require parameters and processing resumes at task 9.4

9.3 The line following the application name is checked for control word :ASK. If found, the user is asked to input parameters as described in tasks 6.2 and 6.3. If said control word is not found, said line is treated as a parameter string.

9.4 Memory above the end of menu is released to the system.

10. EXECUTE APPLICATION.

10.1 Said application name is loaded with parameters, if any, and executed with DOS function exec.

10.2 Following execution, driver reclaims previously released memory and loops back to task 2.1.

11. RETRIEVE PATH FILES.

11.1 Retrieves directory information from the current directory, for files with extensions COM, EXE or BAS, and stores this file list in the memory buffer previously used for storing the parent file in task 3.3 above. The current directory was set according to the specified path in task 8.1.

12. DISPLAY FILES & SELECT ONE.

12.1 Scrolls the file list on the screen and prompts the user to select a file for execution.

12.2 The user can indicate at this point whether she wants to pass any parameters to the file being executed.

12.3 If the user wants to quit the current task, the driver loops back to task 2.1

12.4 If user selects a file, memory above the end of file list in the fourth memory buffer described in task 1.1 above is released to the system.

13. EXECUTE FILE.

13.1 If the file selected has an extension COM or EXE, the file name and extension is loaded and executed with DOS function exec. Otherwise, the program BASICA.COM is loaded and the selected file name with extension is passed as parameters. In either case, any parameters inputted by the user are also passed to the respective program.

13.2 Following execution, driver reclaims previously released memory and loops back to task 12.1

Those skilled in the art will appreciate, that batch modules or PIF modules are inconvenient to set up for single commands. Thus if an user wants to format a diskette, it would be an inconvenience to set up a module. Therefore, a driver, such as herein described, may provide such single command services, through other means.

The said preferred and actually implemented embodiment of this invention, in fact does just that, by assigning other fkeys to those services and by other means.

OPERATION OF THE INVENTION

The user sets up his applications as modules inside a parent file as set forth in the specifications herein above.

The batch module is used for programs using batch commands or to set up applications that can use all the memory that is made available to them. When executing an application through a batch module, the computer program of this invention does not occupy any memory. Applications such as data base management systems, spreadsheet programs, word processor are best set up inside batch modules.

Applications that use a finite amount of memory are set up as PIF modules, if the amount of memory left over after meeting the requirements of the driver of this invention, is adequate for the application.

When executing application modules, said driver occupies about 34 k bytes of memory, or less depending upon the size of the menu file. Path modules use up an additional 12 k of memory or less depending on the number files retrieved. These figures can vary with the implementation and are not part of the specification of this invention. The objective is to make the code as small as possible.

Path modules are ideal for small utilities or tools, user written programs, games, etc.

For each module, a menu item is created by executing the above described CBF. The menu item format is the same irrespective of the type of the module.

On the personal computers running under DOS, The CBF may be invoked automatically at logon by including it in the autoexec.bat file. Thus:

C: CBF.BAT

The same facility is available on most other systems.

To execute the batch modules from RAM disk, the user sets up the VDISK command in the config.sys file. The RAM disk will be created at each logon and automatically erased on logoff.

Then the user includes a command in the autoexec.bat file a command to copy the afore said CBF file to the RAM disk and modifies the invocation of the CBF file. Thus:

Copy C:\CBF.BAT D:\

D:\CBF where
C is the resident drive, and
D is the RAM disk.

CBF calls the driver, as described above. Said driver then copies the contents of the batch module to be executed to the batch files $$ or $$$$, as described above. Said driver is programmed to create the said $$ and $$$$ batch files on the device from which CBF is executed.

The user may also elect to run said driver from the RAM disk. If so, the driver is also copied to the RAM disk through the autoexec.bat file, the invocation of the said driver from the said file is changed to reflect the new device. Alternatively, the invocation may be changed through the setup procedure.

CONCLUSION AND SCOPE OF THE INVENTION

As the reader will see this invention achieves great economies in the storage of batch files and PIFs, simplifies their execution and improves their performance through faster access, effective memory management and by relocating batch modules to faster devices.

While the above description of the invention contains many specificities, these specificities should not be construed as limitations on the scope of the invention. Rather, they are an exemplification of one preferred embodiment.

For example: While most operating systems impose a limit on the size of the file name, there is no similar limit on the size of the module name: it can be 80 characters long. Accordingly, it is possible to dispense with the descriptive phrase in the menu. Indeed the menu could be generated automatically, any time after the the parent file had been updated.

Thus a module could have a name like
A.BUSINESS MANAGER
where A is the file name of the parent file.

Another example: A computer program, according to this invention, could be set up so it treats upper case module names as batch modules and lower case as PIF modules.

Yet another example: the afore said driver of this invention could use a secondary copy of the DOS command processor to execute the batch module. This option would add an additional 25 k bytes in memory but would be worth considering in systems where memory is not a significant consideration.

The above described alternative might actually be the preferred embodiment in multitasking environments, running under OS/2. OS/2 is a trade mark of International Business Machines Corp. It is a new operating system designed for the upper end personal computers. OS/2 supports two kinds of batch files, one with the extension BAT and compatible with the corresponding DOS batch file and the other with the extension CMD. A control word :CMD could be used to identify CMD batch modules and processed with a secondary copy of its corresponding command processor. Instead of creating a file with the name $$, the created file will have the same name as the module, and could be automatically erased after execution.

The above considerations would also hold true for multiuser, multitasking environments like UNIX and its derivatives like XENIX. XENIX is a registered trade mark of Microsoft Corporation.

I claim:

1. A method of operating a computer, said computer comprising main memory, a disk storage system and optionally a ram disk, to enable an user of said computer to execute batch files and application programs through a menu driver loaded into said main memory, wherein information about said application programs is specified in one or more types of program information files or in batch files, said program information files and batch files further setup as modules inside one or more parent files on said disk storage system, whereby a plurality of different types of modules may be stored together, to conserve disk space, and each module uniquely identified by a name or code, the user selecting a module for processing through said menu driver which displays a menu comprising, for each module, said name or code and optionally any other information descriptive of the module, the selected module then processed independently of any other according to its type, said method comprising the steps of:
    (a) processing batch modules by
        (i) relocating the selected module elsewhere on said disk storage system or ram disk;
        (ii) executing the relocated module as an independent batch file from its new storage location, to achieve faster execution;
    (b) processing path modules by
        (i) displaying the application programs from the path specified in the selected module;
        (ii) prompting the user to select any of the displayed application programs;
        (iii) executing the selected program;
        (iv) repeating steps (i) to (iii) as often as desired by the user;
    (c) processing application modules by executing the application program specified in the selected module.

2. A method of operating a computer, said computer comprising main memory, a disk storage system, a batch file processor and optionally a ram disk, to enable an user of said computer to execute batch files and application programs through a menu driver loaded into said memory, wherein information about said application programs is specified in one or more types of program information files or in batch files, said program information files and batch files further set up as modules inside one or more parent files on said disk storage system, whereby a plurality of one or more types of modules may be stored together in one parent file to conserve disk space, and each module identified by a name or code, and processed through said driver, said method comprising the steps of:
    (a) displaying a menu comprising, for each module in said disk storage system, the name or code of the module and optionally any other information descriptive of said module;
    (b) prompting the user to select a module for processing;
    (c) retrieving the selected module from its parent file into main memory;
    (d) determining the type of said retrieved module;
    (e) executing the batch module or the application programs specified by said retrieved module, independently of any other module in the parent file.

3. The method of claim 2, in a disk storage system containing more than one said parent file, wherein each module is assigned a two part name or code, one part uniquely identifying the parent file where said module resides, and the second part identifying the module within its parent file, said method further comprising the step of:
    (a) retrieving the module selected by the user, from its identified parent without having to search through every parent file on said disk storage system.

4. The method of claim 2, said method further comprising the step of:
   (a) generating the menu from the information in the parent file or files.

5. The method of claim 2, wherein information required to determine the type of module is included in the module itself.

6. The method of claim 2, wherein the retrieved module is determined to be of the type batch module, said method further comprising the step of:
   (a) executing said batch module from main memory.

7. The method of claim 2, wherein the retrieved module is determined to be of the type batch module, said method further comprising the steps of:
   (a) relocating the retrieved module elsewhere on said disk storage system or ram disk;
   (b) executing the relocated module as an independent batch file from its new storage location, through a secondary copy of said batch file processor.

8. The method of claim 2, wherein the retrieved module is determined to be of the type batch module, said method further comprising the steps of:
   (a) relocating the retrieved module elsewhere on said disk storage system or ram disk;
   (b) releasing the entire main memory, occupied by said driver;
   (c) executing the relocated module as an independent batch file from its new storage location, to achieve faster execution;
   (d) reloading said driver into main memory after the batch file terminates.

9. The method of claim 8, further comprising the steps of:
   (a) copying said driver from said disk storage system to said ram disk;
   (b) loading said driver from said ram disk into said main memory;
   (c) reloading said driver into said main memory, whenever needed, from said ram disk to speed up the reloading process.

10. The method of claim 8, wherein said batch file requires one or more parameters passed to it during execution, said method further comprising the steps of:
    (a) prompting the user for said parameters;
    (b) passing said parameters to the relocated module.

11. The method of claim 2, wherein the retrieved module is determined to be of the type batch module, said method further comprising the steps of:
    (a) modifying the retrieved module to add to it instructions to load said driver into main memory;
    (b) relocating the modified module elsewhere on said disk storage system or ram disk;
    (c) releasing the entire main memory, occupied by said driver;
    (d) executing the relocated module as an independent batch file from its new storage location, to achieve faster execution, said relocated module automatically reloading said driver into said main memory after the batch file terminates.

12. The method of claim 11, wherein said batch file requires one or more parameters passed to it during execution, said method further comprising the steps of:
    (a) prompting the user for said parameters;
    (b) creating a batch file to execute the relocated module with said parameters.

13. The method of claim 2, wherein the retrieved module is a program information module, said module specifying an application program requiring additional main memory, said method further comprising the steps of:
    (a) modifying the retrieved module, by adding instructions, to enable said module to function like a batch module;
    (b) relocating the modified module elsewhere on said disk storage system or ram disk;
    (c) releasing the entire main memory, occupied by said driver;
    (d) executing the relocated module as an independent batch file from its new storage location;
    (e) reloading said driver into said memory after the batch file terminates.

14. The method of claim 13, wherein said batch file requires one or more parameters passed to it during execution, said method further comprising the steps of:
    (a) prompting the user for said parameters;
    (b) passing said parameters to the relocated module.

15. The method of claim 2, in a disk storage system containing more than one directory and each said directory accessed through a path, wherein the retrieved module is a program information module and said module specifies a path to a directory where a plurality of application programs reside, said method further comprising the steps of:
    (i) retrieving information about the application programs from the specified path, into said main memory;
    (ii) displaying said information as a menu, said menu comprising the names or other identifying information about said application programs;
    (iii) prompting the user to select any of the programs named or identified in said menu;
    (iv) executing the selected program;
    (v) repeating steps (ii) to (iv) as often as desired by the user.

16. A method of operating a computer, said computer comprising main memory, a disk storage system, and optionally a ram disk, to enable an user of said computer to execute application programs and batch files through a menu driver without said driver occupying any main memory while said application programs or batch files are being executed, wherein information about said application programs is specified in program information files, said program information files and batch files stored in said disk storage system, the user selecting a program information file or batch file for processing by loading said menu driver into main memory, said driver then displaying a menu comprising, for each said program information file or batch files its name or any other identifying or descriptive information, said method comprising the steps of:
    (a) retrieving the selected file into main memory;
    (b) determining if the retrieved file is a batch file or program information file;
    (c) If the retrieved file is a batch file, said method further comprising the steps of:
        (i) relocating the batch file elsewhere on said disk storage system or ram disk;
        (ii) releasing the entire main memory occupied by said driver;
        (iii) executing the relocated batch file from its new storage location,
        (iv) reloading said driver into main memory after the batch file terminates;

(d) if the retrieved file is program information file, said method further comprising the steps of:
   (i) modifying said selected file by adding instructions to enable it to function as a batch file;
   (ii) relocating the modified file elsewhere on said disk storage system or ram disk;
   (iii) releasing the entire main memory, occupied by said driver;
   (iv) executing the relocated file as a batch file from its new storage location;
   (v) reloading said driver into said main memory after the batch file terminates.

* * * * *